(No Model.)
R. McA. LLOYD.
MANUFACTURE OF SECONDARY BATTERY ELECTRODES.
No. 491,684. Patented Feb. 14, 1893.
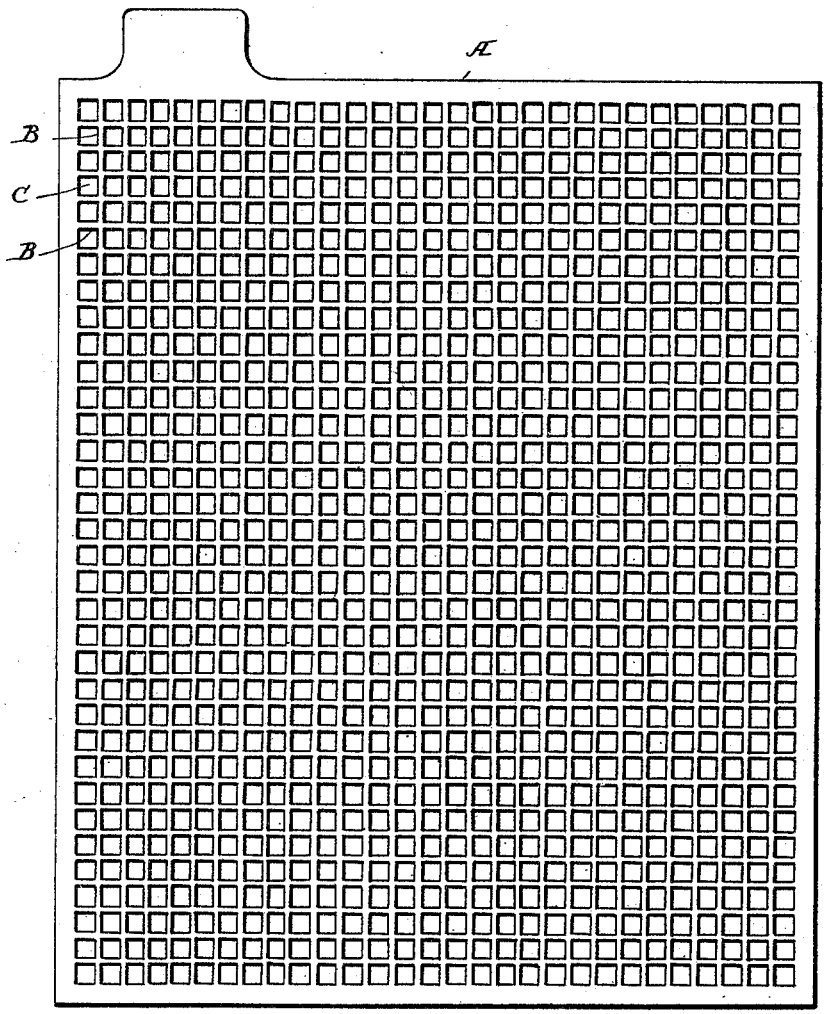

United States Patent Office.

ROBERT McA. LLOYD, OF NEW YORK, N. Y.

MANUFACTURE OF SECONDARY-BATTERY ELECTRODES.

SPECIFICATION forming part of Letters Patent No. 491,684, dated February 14, 1893.

Application filed September 30, 1892. Serial No. 447,397. (No specimens.)

*To all whom it may concern:*

Be it known that I, ROBERT McA. LLOYD, a citizen of the United States, residing in the city, county, and State of New York, have invented certain new and useful Improvements in the Manufacture of Secondary-Battery Electrodes, of which the following is a specification.

My invention relates to the manufacture of secondary battery plates or elements, and it has for its object to improve the process of making such plates or elements whereby an effective plate is cheaply and rapidly produced; and to these ends my invention consists in the process substantially as hereinafter more particularly pointed out.

Referring to the accompanying drawing I have illustrated my process as applied to a plate in the form of a grid, which is represented in side view, and which consists essentially of a frame A, having a series of partitions B, forming spaces or openings C, and while I have found this a desirable form of plate to use in carrying out my process, it will be understood by those skilled in the art that my invention is not limited to this particular form of plate, nor to the particular material, as others skilled in the art can vary the material as well as the form, without departing from the spirit of my invention.

The plate as above represented, preferably made of lead or lead alloy, is subjected to the action of a solution, by means of which it is honey-combed, and active material or material to become active is chemically deposited thereon which solution is in the first instance acid, but which, as the treatment goes on, becomes and remains alkaline, as determined by test papers. While various solutions may be used, I have found a solution of dilute nitric acid to which a small percentage of carbonate of potash, has been added or other alkali to be effective. The plate being immersed in this solution, the solution is heated or even boiled, and the surface of the plate becomes honey-combed, or pitted. The time to which this plate is subjected to the boiling process, depends upon various conditions, as the size and character of the plate, and the strength of the solution, but I have found that with an aqueous solution of about one per cent. of nitric acid and one percent. carbonate of potash, for instance, the surface of a plate, substantially as shown in the drawing, will become thoroughly honey-combed in about one hour. During this process there is deposited chemically on the plate active material, or material to become active, such as lead, or some of its combinations, in the state of minute subdivision, filling the honey-combings of the plate and covering its surface. After the solution becomes alkaline and after sufficient active material is deposited on the plate, it is withdrawn and dried, and is then preferably submitted to the "forming" action by attaching it to the positive pole of an electric circuit in the usual way, it being immersed in a suitable electrolyte, as dilute sulphuric acid, thus forming a plate which may be used as the positive pole or element of a secondary battery. This positive element may be converted into a negative element by attaching it to the negative pole of an electric circuit while immersed in a proper electrolyte, in the usual way. In this way I produce cheaply and rapidly a plate or element consisting essentially of a grid, the surface of which has been thoroughly honey-combed, and the honey-combs filled with the active material, or material to become active, so that the entire surface of the plate is effective in producing current.

What I claim is;

1. The process, substantially as hereinbefore described of preparing secondary plates or elements, which consists in subjecting a plate to the action of a solution which is acid in the beginning, and which afterward becomes alkaline, thereby first producing honey-combs in the surface of the plate, and subsequently chemically depositing thereon active material, or material adapted to become active, and forming the plate in the usual way.

2. The process, substantially as hereinbefore described of preparing secondary battery plates or elements, which consists in subjecting a lead plate to the action of a hot solution, which is first acid and then becomes alkaline thereby first producing honey-combs in the surface of the plate, and subsequently chemically depositing active material or material to become active in the honey-combs, and forming the plate in the usual way.

3. The process, substantially as hereinbefore described of preparing secondary battery plates or elements, which consists in subjecting a lead plate to the action of a hot acid solution of dilute nitric acid to which carbonate of potash, has been previously added producing honey-combs in the surface of the plate, and chemically depositing in the honey-combs active material, such as lead or some of its combinations in a state of minute sub-division.

In testimony whereof I have signed my name to this specification in the presence of two subscribing witnesses.

ROBERT McA. LLOYD.

Witnesses:
JOHN RODGERS,
WM. W. GUSCAN.